Feb. 2, 1932.   A. SCHUBERT   1,843,738
DECORATING LEATHER
Filed July 6, 1929

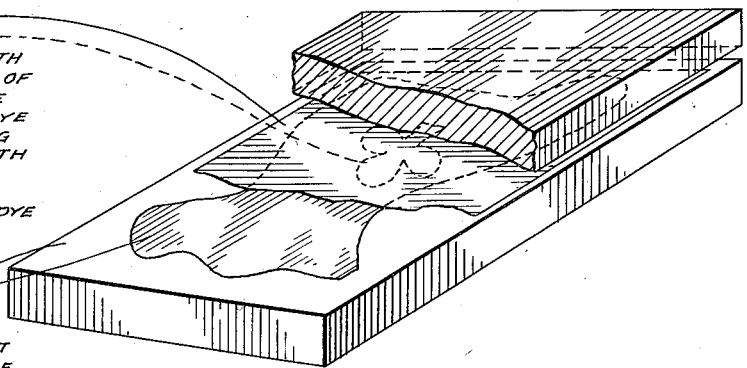

TRANSFER SHEET CARRYING A DESIGN FORMED THEREON WITH AN INK CONSISTING OF A WATER-INSOLUBLE ALCOHOL-SOLUBLE DYE CAPABLE OF DYEING LEATHER MIXED WITH A SUBSTANTIALLY NON-DRYING OIL OR FAT IN WHICH THE DYE IS SUBSTANTIALLY INSOLUBLE, IS PRESSED IN A PRESS TO THE LEATHER TO BE MARKED IN THE PRESENCE OF A TRANSFER SOLVENT WHICH IS PERMEABLE INTO THE OIL OR FAT AND WHICH INCORPORATES A SOLVENT FOR THE DYE.

INVENTOR.
Adolf Schubert
BY
ATTORNEYS.

Patented Feb. 2, 1932

1,843,738

UNITED STATES PATENT OFFICE

ADOLF SCHUBERT, OF MILLBURN, NEW JERSEY, ASSIGNOR TO BARRETT & COMPANY, OF NEWARK, NEW JERSEY, A CORPORATION OF NEW JERSEY

DECORATING LEATHER

Application filed July 6, 1929. Serial No. 376,494.

My invention is a process resembling those transfer-printing processes in which the subject matter is printed initially on sheets of paper, and from these sheets is transferred, by contact and pressure in the presence of a suitable fluid, to the articles or materials to receive the print. So far as I am aware however none of the prior transfer-printing processes are suitable for the decoration of leather: the reasons are various, among these being the non-suitability of the substances used, and the tendency of the colors to bleed whereby lines are blurred and color gradations tend to disappear. The object of my invention is to provide a process of the transfer-printing type which is suitable for decorating leather.

The accompanying drawing illustrates, diagrammatically, an embodiment of my invention.

According to my invention, the coloring matter used in the ink is a dye or mixture of dyes rather than a pigment (including color lakes within the term pigment); that is to say the coloring matter used in the ink is a soluble substance capable of directly affixing itself to and dyeing the fibres of the leather from solution. Furthermore, the coloring matter used is one (or a mixture) of those dyes which are soluble in alcohol and insoluble in water. This class of dyes covers a wide range of fast colors and a wide range of dyes which are insoluble or only very slightly soluble in those materials or substances which are suitable for the vehicles with which the dyes are mixed to form the printing ink as hereinafter described.

For the vehicle part of the ink, that is to say, for the carrier for the dyestuff and which serves to give the ink the necessary viscosity, greasy or tacky nature, and any other characteristics that may be required of inks employed in the particular printing process chosen for laying down the subject matter on the transfer sheets, I choose a substance or substances that will remain on the transfer sheets for some considerable time, that is or are soluble in the transfer-solvent used in making the transfer to the leather, and a substance or substances in which the dye or dyes is substantially insoluble. Various of the fixed or non-drying oils and fats meet these requirements, and particularly the vegetable and animal oils and fats of the non-drying class. Preferably I use castor oil. Such substances can be thickened to the required consistency by suitable substances such as an alcohol-soluble resin or gum, for example rosin, shellac, elimi, mastic, sandarac, etc. Such thickeners I usually mix with the oil or fat before introducing the dye.

The dye or dyes is intermixed with the vehicle of course. At the time the printing is done on the transfer sheets, the dyestuff should be in a solid state, rather than in solution. Preferably therefore I grind the dry, finely powdered dye, or mixture of dyes into the vehicle. I use such proportions as test shows to give the proper strength of color or tinctorial value on the leather. If necessary the mixture can be thinned somewhat thereafter by adding a more fluid substance inert to the dye but miscible to the vehicle, such as xylol, toluol, benzol, etc; these particular thinners do not seem to materially reduce the color strength or tinctorial value, presumably because of their volatility. The dye-vehicle mixture can also be thickened somewhat by adding more oil or fat and resin or gum in suitable proportions, but this tends to reduce the color strength as will be apparent.

With such an ink, the subject matter is printed on to the transfer sheets, for example by blocks or rolls engraved or etched in accordance with the design or ornamentation. For the transfer sheets I preferably use a fibrous material, such as paper or cloth, because of its permeability to the transfer-solvent. A substantially unsized and uncalendered paper, such as is used for newspapers, serves the purpose well.

To make the transfer to the leather, I take one of these transfer sheets in which the dye is held on the face thereof by means of the vehicle part of the ink, and press it inked side to the leather in the presence of a fluid which is a solvent for the dye or dyes, which is also a solvent for the vehicle, which does not attack the leather, and which preferably has a high degree of capillarity. Suitable for this transfer-solvent, so-called, are the organic acids such as oxalic, acetic and tartaric acids in alcohol, the alcohols themselves, ethylene glycol monomethyl ether, ethylene glycol, ethylene glycol monoethyl ether, diethylene glycol monoethyl ether, and other glycols and their ethers. Preferably I use grain alcohol; this is a solvent for both the dyes and the vehicles indicated. I find that grain alcohol of ninety-five percent strength is satisfactory. I believe that the water-insoluble characteristic of the dye is beneficial in the direction of rendering the presence of some water in the transfer-solvent permissible; specifically it renders absolute alcohol unnecessary. In making the transfer, I apply the transfer-solvent to the leather, and apply the transfer sheet dry to the wetted leather. The leather can be dipped in the transfer-solvent, or the transfer solvent sprayed on to the leather, for example. To the wetted leather the ink face of the transfer sheet is then applied and the two are pressed into uniform and close contact. For this purpose I preferably squeeze the two in a press, and I have used up to three hundred pounds per square inch pressure. It is not to be understood however that pressures of this order are necessary, but pressure of this order serve to bring the transfer sheet and leather into uniformly close contact throughout the whole area despite the fact that the thickness of the leather may vary considerably from point to point. After the two have been pressed together momentarily, the pressure is released and the transfer sheet peeled off the leather, whereupon it will be found that the leather has been dyed in accordance with the subject matter as initially printed on the transfer sheet and with the same degree of clarity of outline and gradation of color, and with an adequate strength of color or tinctorial value. If desired, heat can be applied at the same time as the pressure, as by steam-heating the plates of the press. The use of heat is not an essential ordinarily however. After the transfer sheet is removed, the transfer-solvent can be removed from the leather by evaporation; in fact if grain alcohol is used as the transfer-solvent, this will disappear quickly by natural evaporation.

It will be understood that my invention is not limited to the details described above except as appears hereinafter in the claims.

I claim:

1. The method of decorating leather which consists in printing the subject matter on sheets of fibrous material with an ink comprising a dye in a form capable of directly dyeing the fibres of the leather from solution and which is insoluble in water and soluble in alcohol, and a vehicle suiting the ink to the particular process by which the printing is done on the said sheets and which consists of or contains a substantially non-drying oil or fat, which is substantially not a solvent for the dye, and which is soluble in the solvent hereinafter mentioned, the dye and vehicle being mixed together and the dye being in a solid state, pressing, while the said oil or fat is still on the sheets, one of said sheets into smooth contact with a leather in the presence of a solvent for the dye and a solvent for the vehicle, and then removing the sheet from the leather.

2. The method of decorating leather which consists in mixing a dye in a form capable of directly dyeing the fibres of the leather from solution and which is insoluble in water but is soluble in alcohol, the dye being in a finely powdered solid state, with a non-drying oil or fat which is soluble in the solvent hereinafter mentioned and which is substantially not a solvent for the dye, and which suits, with or without the addition of another solvent-soluble or inert substance the resulting ink to the particular printing process by which the sheets hereinafter mentioned are printed, printing the subject matter on sheets of fibrous material with said ink, applying, while the said oil or fat is still on the sheets, one of said sheets to a leather, inked face to the leather, in the presence of a solvent for the dye and a solvent for the said oil or fat, pressing the sheet into firm smooth contact with the leather, and then removing the sheet from the leather.

3. The method of decorating leather which consists in printing the subject matter on sheets of a fibrous material, permeable to the transfer-solvent hereinafter mentioned, with an ink comprising a dye in a form capable of directly dyeing the leather from solution and which is insoluble in water but soluble in alcohol and a vehicle not a solvent for the dye and consisting of a substantially non-drying vegetable or animal oil or fat and an alcohol-soluble resin or gum, the dye and vehicle being mixed together and the dye being in a solid state, pressing, while the vehicle is still present on the sheets, one of said sheets to a leather in the presence of a transfer-solvent of the class of those hereinbefore specifically named, the inked face of the sheet being applied to the leather, and then removing the sheet from the leather.

4. The method of decorating leather which consists in printing the subject matter on sheets of a fibrous material with an ink comprising a dye in a form capable of directly dyeing the leather from solution and which is insoluble in water but soluble in alcohol, and a vehicle not a solvent for the dye and consisting of a substantially non-drying vegetable or animal oil or fat and an alcohol-soluble resin or gum, the dye and vehicle being mixed together and the dye being in a solid state, applying to a leather a solvent for the dye and a solvent for said vehicle, pressing one of said sheets to said leather while the solvent is still in the leather and vehicle is still on the sheet, and then removing the sheet from the leather.

5. The subject matter of claim 1, characterized by the fact that the fibrous material is a substantially unsized and uncalendered paper.

In testimony whereof, I have signed this specification.

ADOLF SCHUBERT.